United States Patent
Molina Mesa et al.

(10) Patent No.: US 11,478,877 B2
(45) Date of Patent: Oct. 25, 2022

(54) REINFORCING STRUCTURAL COMPONENTS

(71) Applicant: AUTOTECH ENGINEERING, S.L., Amorebieta-Etxano (ES)

(72) Inventors: Ricardo Molina Mesa, Sant Esteve Sesrovires (ES); Oscar Bertolin Pradas, Sant Esteve Sesrovires (ES)

(73) Assignee: AUTOTECH ENGINEERING, S.L., Amorebieta-Etxano (ES)

( * ) Notice: Subject to any disclaimer, the term of this patent is extended or adjusted under 35 U.S.C. 154(b) by 616 days.

(21) Appl. No.: 16/334,315

(22) PCT Filed: Sep. 19, 2017

(86) PCT No.: PCT/EP2017/073634
§ 371 (c)(1),
(2) Date: Mar. 18, 2019

(87) PCT Pub. No.: WO2018/054902
PCT Pub. Date: Mar. 29, 2018

(65) Prior Publication Data
US 2019/0202003 A1    Jul. 4, 2019

(30) Foreign Application Priority Data
Sep. 20, 2016   (EP) .................................... 16382438

(51) Int. Cl.
*B23K 26/342*   (2014.01)
*B23K 26/00*   (2014.01)
(Continued)

(52) U.S. Cl.
CPC ............ *B23K 26/342* (2015.10); *B21D 22/02* (2013.01); *B22F 7/08* (2013.01); *B22F 10/20* (2021.01);
(Continued)

(58) Field of Classification Search
CPC ...... B21D 22/02; B22F 10/20; B22F 2301/35; B22F 7/08; B23K 2101/006;
(Continued)

(56) References Cited

U.S. PATENT DOCUMENTS 6,143,378 A * 11/2000 Harwell .................. C23C 26/02
427/597
9,199,292 B2 * 12/2015 Wunsch ................. B23K 26/06
(Continued)

FOREIGN PATENT DOCUMENTS

CN    101792906 B  *  7/2012
DE    19835559 A1     2/2000
(Continued)

OTHER PUBLICATIONS

English translation of CN-101792906-B (Year: 2012).*
(Continued)

*Primary Examiner* — Chris Q Liu
(74) *Attorney, Agent, or Firm* — Squire Patton Boggs (US) LLP

(57) ABSTRACT

A method for manufacturing structural steel components with local reinforcement is provided. The method comprises selecting at least a zone of the component to be reinforced, providing a steel blank and deforming the blank in a press tool to form a product, wherein the blank and/or the product comprises a groove in the zone to be reinforced, the groove comprising an inner surface and an outer surface. The method further comprises depositing a reinforcement material on the inner surface of groove and locally heating the reinforcement material and the groove of the steel blank or product, to mix the melted reinforcement material with the melted portion of the steel blank or product.

15 Claims, 9 Drawing Sheets

(51) Int. Cl.

| | | |
|---|---|---|
| *C23C 24/10* | (2006.01) | |
| *C23C 26/02* | (2006.01) | |
| *B23K 26/144* | (2014.01) | |
| *B23K 9/04* | (2006.01) | |
| *B23K 103/04* | (2006.01) | |
| *C21D 1/673* | (2006.01) | |
| *B22F 7/08* | (2006.01) | |
| *B23K 9/23* | (2006.01) | |
| *B23K 26/348* | (2014.01) | |
| *B23K 9/16* | (2006.01) | |
| *B33Y 10/00* | (2015.01) | |
| *B22F 10/20* | (2021.01) | |
| *B21D 22/02* | (2006.01) | |
| *B23K 101/00* | (2006.01) | |
| *B23K 101/18* | (2006.01) | |

(52) U.S. Cl.
CPC ............... *B23K 9/044* (2013.01); *B23K 9/16* (2013.01); *B23K 9/23* (2013.01); *B23K 26/0093* (2013.01); *B23K 26/144* (2015.10); *B23K 26/348* (2015.10); *B33Y 10/00* (2014.12); *C21D 1/673* (2013.01); *C23C 24/106* (2013.01); *C23C 26/02* (2013.01); *B22F 2301/35* (2013.01); *B23K 2101/006* (2018.08); *B23K 2101/185* (2018.08); *B23K 2103/04* (2018.08); *C21D 2211/008* (2013.01); *C21D 2251/00* (2013.01)

(58) Field of Classification Search
CPC .......... B23K 2101/185; B23K 2103/04; B23K 26/0093; B23K 26/144; B23K 26/342; B23K 26/348; B23K 9/044; B23K 9/16; B23K 9/23; B23K 26/34; B23K 2103/08; B23K 2101/16; B23K 2103/50; B23K 26/06; B23K 26/24; B23K 26/32; B23K 26/322; B23K 2103/05; B23K 1/0018; B23K 1/0056; B23K 1/19; B23K 1/20; B23K 1/203; B23K 2101/001; B23K 2101/34; B23K 2103/14; B23K 2103/26; B23K 26/0006; B23K 26/354; B23K 35/36; B33Y 10/00; C21D 1/673; C21D 2211/008; C21D 2251/00; C23C 24/106; C23C 26/02; Y02P 10/25

USPC ............ 219/121.66, 121.64, 126, 137 R, 73, 219/78.16

See application file for complete search history.

(56) References Cited

U.S. PATENT DOCUMENTS

| | | | |
|---|---|---|---|
| 2003/0068518 A1* | 4/2003 | Ando .................. | B23K 35/327 427/596 |
| 2015/0314363 A1* | 11/2015 | Nelson .................. | B23K 11/115 219/78.16 |
| 2016/0052016 A1* | 2/2016 | Te .......................... | B05D 3/002 118/44 |

FOREIGN PATENT DOCUMENTS

| | | | | |
|---|---|---|---|---|
| DE | 102013219250 A1 | 3/2014 | | |
| EP | 2907603 A2 | 8/2015 | | |
| WO | WO 2012/150352 A2 | 11/2012 | | |
| WO | WO 2016/001360 A1 | 1/2016 | | |
| WO | WO-2016001360 A1 * | 1/2016 | ............. | B22F 12/00 |
| WO | WO 2017/103127 A1 | 6/2017 | | |
| WO | WO-2017103174 A1 * | 6/2017 | ......... | B23K 26/0608 |

OTHER PUBLICATIONS

Autoform, Hot Forming, Sep. 3, 2016 (Year: 2016).*
International Search Report and Written Opinion dated Dec. 12, 2017, for PCT Application No. PCT/EP2017/073634, 9 pages.
Extended European Search Report dated Mar. 1, 2017, for European Patent Application No. 16382438, 6 pages.

* cited by examiner

REINFORCING STRUCTURAL COMPONENTS

The present disclosure relates to methods for manufacturing reinforced structural components and to the structural components obtained through them.

BACKGROUND

The demand for weight reduction in e.g. the automotive industry has led to the development and implementation of lightweight materials, manufacturing processes and tools. The growing concern for occupant safety also has led to the adoption of materials which improve the integrity of the vehicle during a crash while also improving the energy absorption. In that sense, vehicle parts made of High Strength and Ultra High Strength Steel (UHSS) are often employed in order to satisfy criteria for lightweight construction.

Typical vehicle components that need to meet weight goals and safety requirements include structural and/or safety elements such as door beams, bumper beams, cross/side members, A/B-pillar reinforcements, and waist rail reinforcements.

For example, a process known as Hot Forming Die Quenching (HFDQ) uses boron steel sheets to create stamped components with UHSS properties, with tensile strengths of at least 1000 MPa, preferably approximately 1500 MPa or up to 2000 MPa or more. The increase in strength allows for a thinner gauge material to be used, which results in a weight savings over conventionally cold stamped mild steel components.

Simulations performed during the design phase of a typical vehicle component can identify points or zones of the formed component that need reinforcement (because lighter and thinner metal sheets and blanks are used) in order to increase strength and/or stiffness. Alternatively a redesign may be done in order to steer deformations.

In that sense, there are several procedures with which some areas of a component can be reinforced or softened in order to redistribute stress and save weight by reducing the thickness of the component. These known procedures for reinforcing a component are, for example, procedures adding welded reinforcements prior to any deforming process. Such reinforcements may be "patchworks" in which partial or complete overlapping of several blanks may be used, or blanks or plates of different thickness that may be welded "edge to edge", i.e. Tailor Welded Blanks (TWB) or Tailor Rolled Blanks (TRB). Structural mechanical requirements can thus be achieved theoretically with a minimum of material and thickness (weight).

In some of these methods however, further manufacturing processes are involved. For example, when Ultra High Strength Steels (e.g. Usibor 1500P) are being hot formed some weldability problems may arise due to an aluminium-silicon (AlSi) coating usually used to protect from corrosion and oxidation damage. In order to overcome these problems it is known to remove a part of the coating in an area close to the welding gap by laser ablation. However, this represents an additional step in the manufacturing process of a vehicle component.

Furthermore, when welded reinforcements (patchworks) are added to a blank, partial or complete overlapping of blanks occur.

Depending on the component being formed there may be regions in which it is not possible or it is at least cumbersome to use welded reinforcements e.g. corners or areas with elevation changes. Patchworks are normally welded using a spot welding which requires a minimum space to distribute the spots. Additionally, patchworks need a minimum size in order to be easily welded. This may involve an extra weight as the reinforcement needs to have a minimum size in order to be welded rather than having the right size (minimum) needed to reinforce the required area.

The aforementioned problems and/or challenges are not unique to the automotive industry or to the materials and processes used in that industry. Instead these challenges may be encountered in any industry wherein weight reduction is an objective. When weight reduction is an objective, the components become ever thinner which can thus lead to an increased need for reinforcements.

It is an object of the present disclosure to provide improved methods of manufacturing reinforced structural components.

SUMMARY

A method for manufacturing structural steel components with local reinforcement is provided. The method comprises selecting at least a zone of the component to be reinforced, providing a steel blank and deforming the blank in a press tool to form a product, wherein the blank and/or the product comprises a groove in the zone to be reinforced, the groove comprising an inner surface and an outer surface. The method further comprises depositing a reinforcement material on the inner surface of groove and locally heating the reinforcement material and the groove of the steel blank or product, to mix the melted reinforcement material with the melted portion of the steel blank or product.

"Product" as used herein may refer to an intermediate product (a semi-finished component) or to an end product (a finished component).

In some examples, the deposition of reinforcement material in the groove and locally heating the reinforcement material may be carried out in the blank, before hot forming and quenching. In other examples, the deposition of reinforcement material in the groove and locally heating the reinforcement material may be carried out in the formed component, i.e. the product, after hot forming and quenching.

Making a groove permits a precise material deposition process as the zone to be reinforced is already predefined. The formation of the groove allows different types of material to be deposited, e.g. a powder, a paste or a filler wire. The use of a groove enables the combination of two different reinforcement types. On the one hand, the purely geometric reinforcement which is obtained by creating a discontinuity in the blank, i.e. making the groove, which improves resistance to buckling forces. And on the other hand, the use of a reinforcement material improves the behaviour of the reinforcement.

The groove also allows removal of a surplus of a reinforcement material. Locally depositing the reinforcement material can reduce the need for e.g. patchwork blanks or tailor welded blanks, and provide reinforcements exactly where they are needed. Another aspect of using a groove is that a hybrid welding technology (combining laser welding and an arc welding torch) might be used as a way of depositing reinforcement material more rapidly. One effect related to welding and to laser heating is that there usually is a relatively large Heat Affected Zone (HAZ). If hot forming (and cooling or quenching) is performed after the welding, the negative effects related to a HAZ largely or completely disappear.

The reinforcement material, independent of its form (powder or otherwise), may be stainless steel AISI 316L, as commercially available from e.g. Hoganäs®. The powder may have the following composition in weight percentages: 0-0.03% carbon, 2.0-3.0% of molybdenum, 10-14% of nickel, 1.0-2.0% of manganese, 16-18% chromium, 0.0-1.0% of silicon, and the rest iron and impurities. Alternatively 431L HC, as commercially available from e.g. Hoganäs® may be used. This powder has the following composition in weight percentages: 70-80% of iron, 10-20% of chromium, 1.0-9.99% of nickel, 1-10% of silicon, 1-10% of manganese and the rest impurities. It may be also possible to combine these reinforcement materials. For example, a reinforcement material comprising 35% in weight of AISI 316L and 65% in weight of 431L HC exhibits good ductility and strength.

Further examples may use 3533-10, as further commercially available from e.g. Hoganäs®. The powder has the following composition in weight percentages: 2.1% carbon, 1.2% of silicon, 28% of chromium, 11.5% of nickel, 5.5% of molybdenum, 1% of manganese and the rest iron and impurities.

It was found that the presence of nickel in these compositions led to good corrosion resistance and promoted the austenite formation. The addition of chromium and silicon aids in corrosion resistance, and molybdenum aids in increasing the hardness. In alternative examples other steels may also be used, even UHSS such as 22MnB5. In some examples where the reinforcement material is powder, the powder may incorporate any component providing different (e.g. higher) mechanical characteristics depending on circumstances. The above mentioned reinforcement materials may be easy to melt, dilute and mix with the part of the steel substrate by a laser beam.

According to examples, the method further comprises directly or indirectly heating the groove. Heating the groove enables the reinforcement material to penetrate into the blank. Thus, the reinforcement material may be part of the blank before any subsequent process.

According to an example, the provided blank may be made of 22MnB5 which is an example of boron steel used in the automotive industry. The composition of 22MnB5 is summarized below in weight percentages (rest is iron (Fe) and impurities):

| C | Si | Mn | P | S |
|---|---|---|---|---|
| 0.20-0.25 | 0.15-0.35 | 1.10-1.35 | <0.025 | <0.008 |

| Cr | Ti | B | N |
|---|---|---|---|
| 0.15-0.30 | 0.02-0.05 | 0.002-0.004 | <0.009 |

Several 22MnB5 steels are commercially available having a similar chemical composition. However, the exact amount of each of the components of a 22MnB5 steel may vary slightly from one manufacturer to another. Usibor 1500P is one example of commercially available 22MnB5 steel manufactured by Arcelor. The composition of Usibor is summarized below in weight percentages (rest is iron (Fe) and impurities):

| C | Si | Mn | P | S | Cr | Ti | B | N |
|---|---|---|---|---|---|---|---|---|
| 0.24 | 0.27 | 1.14 | 0.015 | 0.001 | 0.17 | 0.036 | 0.003 | 0.004 |

In other examples the 22MnB5 may contain approximately 0.23% C, 0.22% Si, and 0.16% Cr. The material may further comprise Mn, Al, Ti, B, N, Ni in different proportions.

Various other steel compositions of UHSS may also be used in the automotive industry. Particularly, the steel compositions described in EP 2 735 620 A1 may be considered suitable. Specific reference may be had to table 1 and paragraphs 0016-0021 of EP 2 735 620, and to the considerations of paragraphs 0067-0079. In some examples the UHSS may contain approximately 0.22% C, 1.2% Si, and 2.2% Mn. These steels may be air hardened, i.e. they do not require quenching in e.g. a press tool in order to obtain a martensitic microstructure.

Steel of any of these compositions (both 22MnB5 steel such as e.g. Usibor and the other compositions mentioned or referred to before) may be supplied with a coating in order to prevent corrosion and oxidation damage. This coating may be e.g. an aluminum-silicon (AlSi) coating or a coating mainly comprising zinc or a zinc alloy.

In a further aspect, a component as obtained or obtainable by any of the methods described herein is provided.

BRIEF DESCRIPTION OF THE DRAWINGS

Non-limiting examples of the present disclosure will be described in the following with reference to the appended drawings, in which.

DETAILED DESCRIPTION OF EXAMPLES

Figure 1:
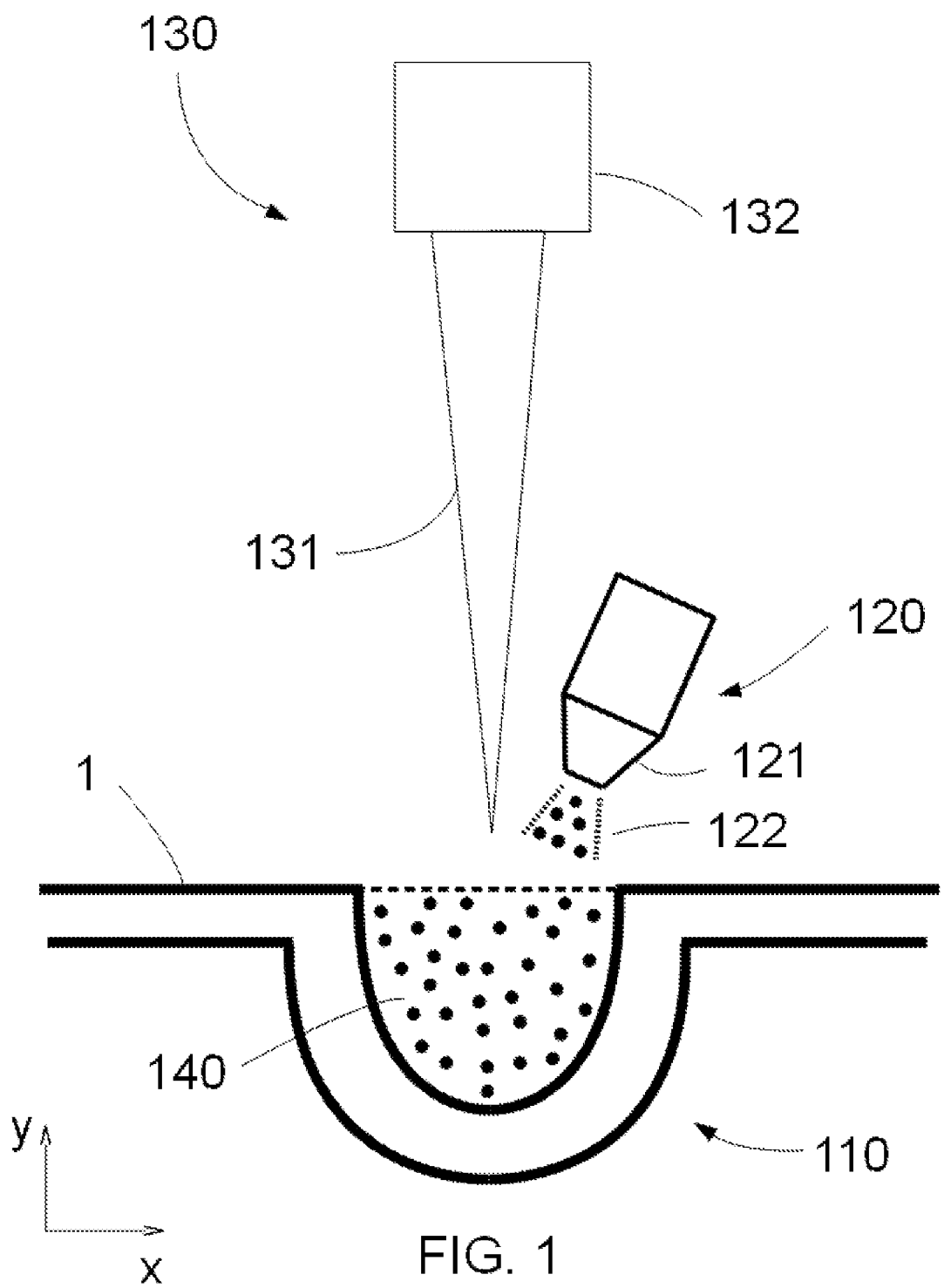
FIG. 1 schematically illustrates an example of a blank with a groove filled with reinforcement material.

FIG. 1 depicts a zone of a blank 1 wherein a groove 110 has been created e.g. by a cold deforming process before, simultaneous or subsequent to cutting the blank from a steel coil. The groove 110 may be provided in an area of the blank which corresponds to an area of the structural component that requires a reinforcement.

A powder or gas flow 122 may exit a nozzle 121 at a predetermined rate. The reinforcement material 140, metal powder in the example of FIG. 1 is, may thus be deposited in the groove 110.

The nozzle 121 may be movable at least along the groove i.e. perpendicular direction to the xy plane in FIG. 1. According to an example, the reinforcement material, e.g. metal powder, may be deposited in several passes along the groove i.e. by applying successive layers of reinforcement material 140, until the groove 110 is fully filled. The reinforcement material may be deposited using any alternative suitable method.

The groove 110 may have a U-shaped cross-section comprising two sidewalls and a bottom wall which fixes the depth and the width of the groove. The dimensions of the groove 110 may be designed e.g. to control the amount of deposited reinforcement material 140 and/or to control the size of the reinforcement to be created. Since a groove 110 is formed, if a surplus of a powder is deposited, the surplus can easily be removed by levelling the surface using e.g. a skimming sheet or by pressing and compacting the deposited reinforcement material. The groove 110 may in some examples possess a width of about 8 mm and a depth of about 1.5-2 mm.

A laser heating system 130 may be used to melt the deposited reinforcement material 140 e.g. metal powder, before subsequent processes. The laser heating system 130 may comprise a laser head 132 from which a laser beam 131 exits. In some examples the spot of a laser beam may heat and melt the reinforcement material and the inner surface of the groove and therefore mixing the melted reinforcement material with the melted layer(s) of the inner surface of the groove. In other examples, a second laser beam may also be used so that the first laser beam melts the reinforcement material and the second laser beam may melt at least a layer of the groove inner surface and thus, the melted reinforcement material may penetrate into the blank. The reinforcement material 140 and the base material 1, i.e. the blank, may therefore be thoroughly joined throughout the entire zone on which the reinforcement is to be formed. The melted reinforcement material may be sufficiently solidified before any subsequent processing.

In some examples the laser beam may have melted the reinforcement material without directly heating any layer of the groove inner surface. In some examples, the inner surface of the groove may be melted by the heat of the reinforcement material.

In some examples, the laser heating may be applied at the same time that the powder is deposited. In other examples, the laser heating may be applied after the powder has been deposited.

In some examples, the laser beam 131 may have a power of between 2 kW and 16 kW, optionally between 2 kW and 10 kW. By increasing the power of the laser beam 131 the overall velocity of the process may be increased.

According to an example (see FIG. 4) the laser heating system 130 and the material depositor 120 may be displaced together along the blank and/or the groove 110 to simultaneously melt and deposit the reinforcement material e.g. metal powder or filler wire. In another example (not shown), a hybrid welding technology combining laser heating and an arc welding torch might be used. The arc welding torch might comprise a filler wire electrode which is melted and thereby can be deposited in the groove.

The laser heating system 130 may further comprise a shield gas channel (not shown) that may be coaxially provided with respect to the laser head 132 to supply a shield gas flow to the zone on which the reinforcement is to be formed i.e. to the groove.

In some examples, helium or a helium based gas may be used as a shielding gas. Alternatively an argon based gas may be used. The flow rate of the shielding gas may e.g. be varied from 1 litres/min to 15 litres/min. In further examples, no shielding gas may be required.

Figure 2:
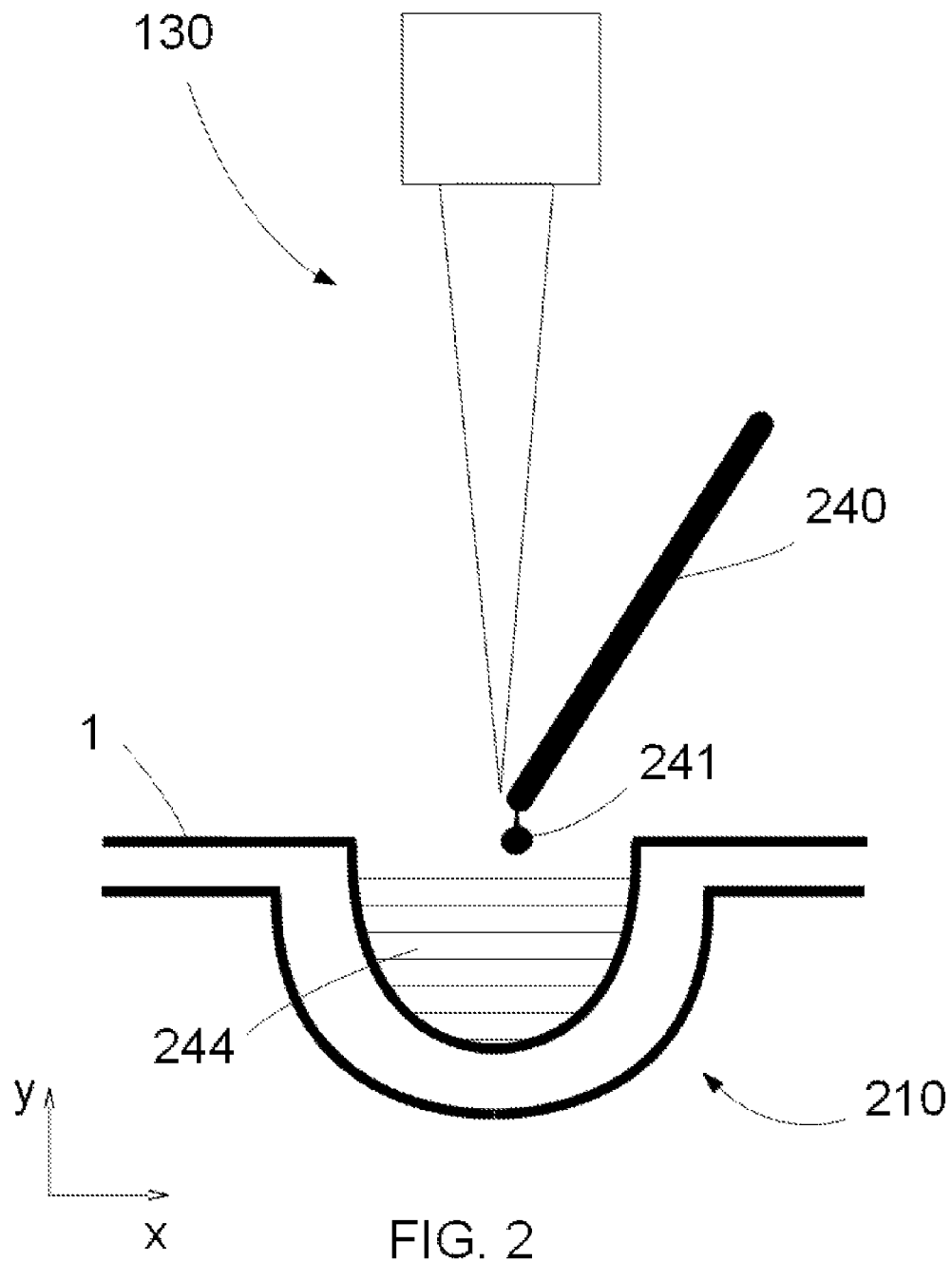
FIG. 2 schematically illustrates another example of applying a reinforcement material in a groove in a blank or component.

FIG. 2 shows an alternative example wherein a filler wire 240 is used as reinforcement material. According to the depicted example, the filler wire 240 may be simultaneously melted and deposited in the groove 210. Drops 241 of the melted filler wire 240 may be deposited in the groove 210. The laser beam may possess enough power to substantially heat (and melt) part of the groove surface. Therefore, the melted material i.e. melted filler wire, may penetrate into the blank 1 enough to join the base material but not sufficiently to change its intrinsic properties e.g. tensile strength. The melted reinforcement material 244 would thus be part of the blank 1.

According to the example of FIG. 2, the filler wire 240 may be melted by a laser heating system 130 which may be located substantially above the groove 210.

In an alternative example, the filler wire 240 may be firstly deposited in the groove 210 and subsequently melted by a laser heating system 130.

Figure 3A:
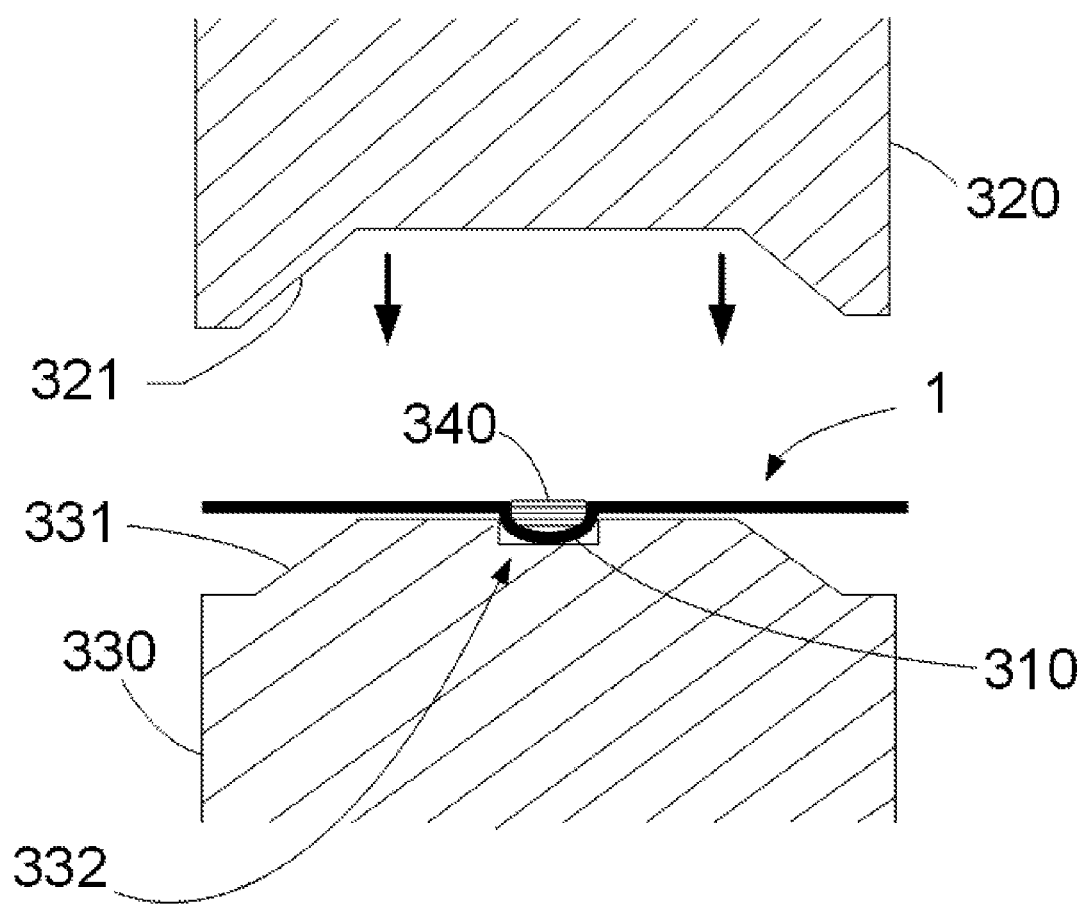
FIGS. 3a-3d schematically illustrate examples of a press tool and examples of manufacturing a structural component with local reinforcement(s)
Figure 3B:
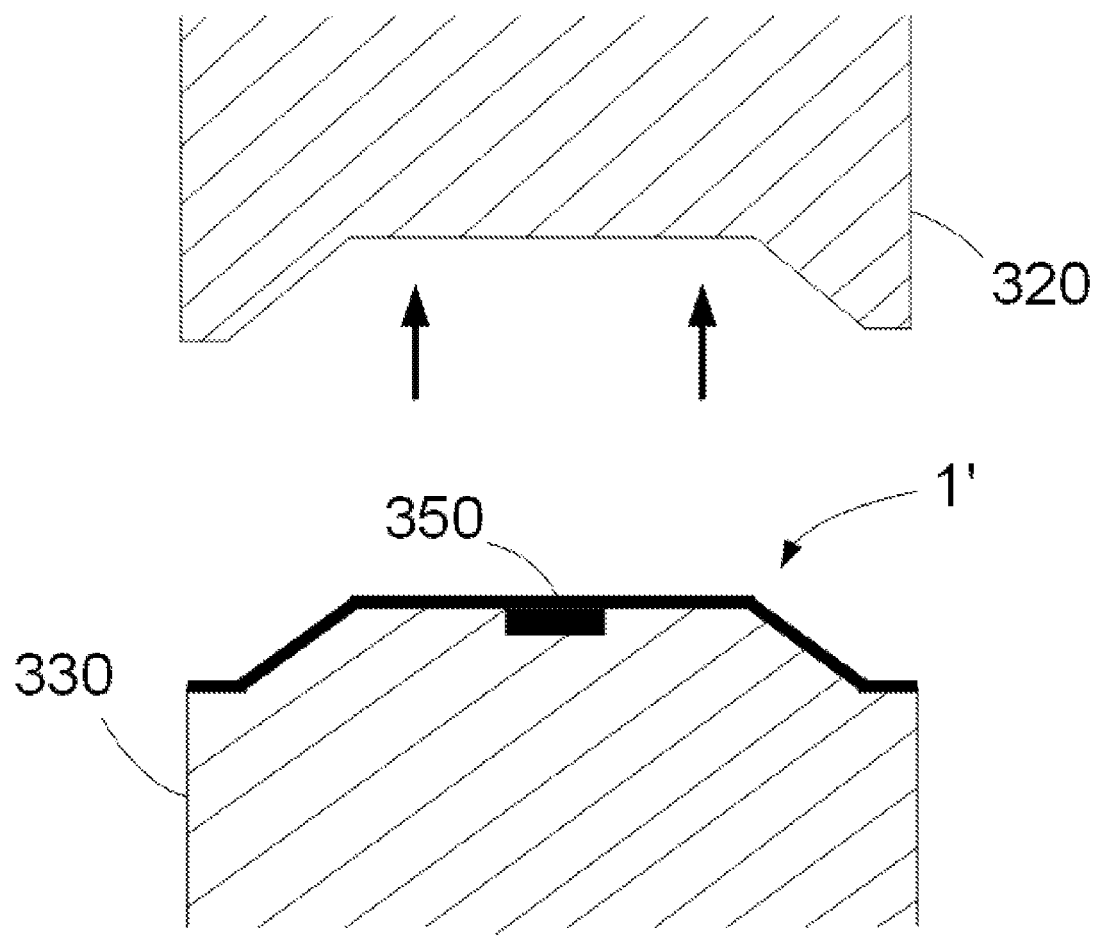

FIGS. 3a and 3b show a press tool configured to form a reinforced structural component from a blank 1 by e.g. a hot or a cold deforming process. FIG. 3a shows a blank 1 previous to a deforming process while FIG. 3b shows an already deformed blank 1'.

The blank 1 shown in FIG. 3a comprises a groove 310 filled with reinforcement material 340 which may have been melted by e.g. a laser heating system before entering the furnace. In alternative examples, the reinforcement material may be melted during the heating process subsequent to the deposition of the blank 1 in the furnace system. Consequently, the reinforcement material and at least a layer of the inner surface of the groove would be mixed.

The press tool may comprise an upper 320 and a lower 330 mating dies and a mechanism (not shown) configured to provide upwards and downwards press progression (see the arrows) of the upper die 320 with respect to the lower die 330. The press progression mechanism may be driven mechanically, hydraulically or servo-mechanically. The upper die 320 and the lower die 330 may respectively comprise an upper working surface 321 and a lower working surface 331 which, in use, face the reinforced blank 1 to be cold or hot deformed.

The lower working surface 331 may comprise a recess 332 defining an inverse geometry of a region of the blank to be reinforced i.e. wherein a groove 310 has been made. Such recess 332 may further be used to correctly center the blank 1 in the press tool by placing the groove 310 in the recess 332.

FIG. 3b shows an example of a formed blank 1', i.e. a product, after being pressed by upper 320 and lower dies 330. The formed blank 1' of the example has been quenched into the press tool and therefore the groove filled with reinforcement material has been converted into a reinforcement 350.

Figure 3C:
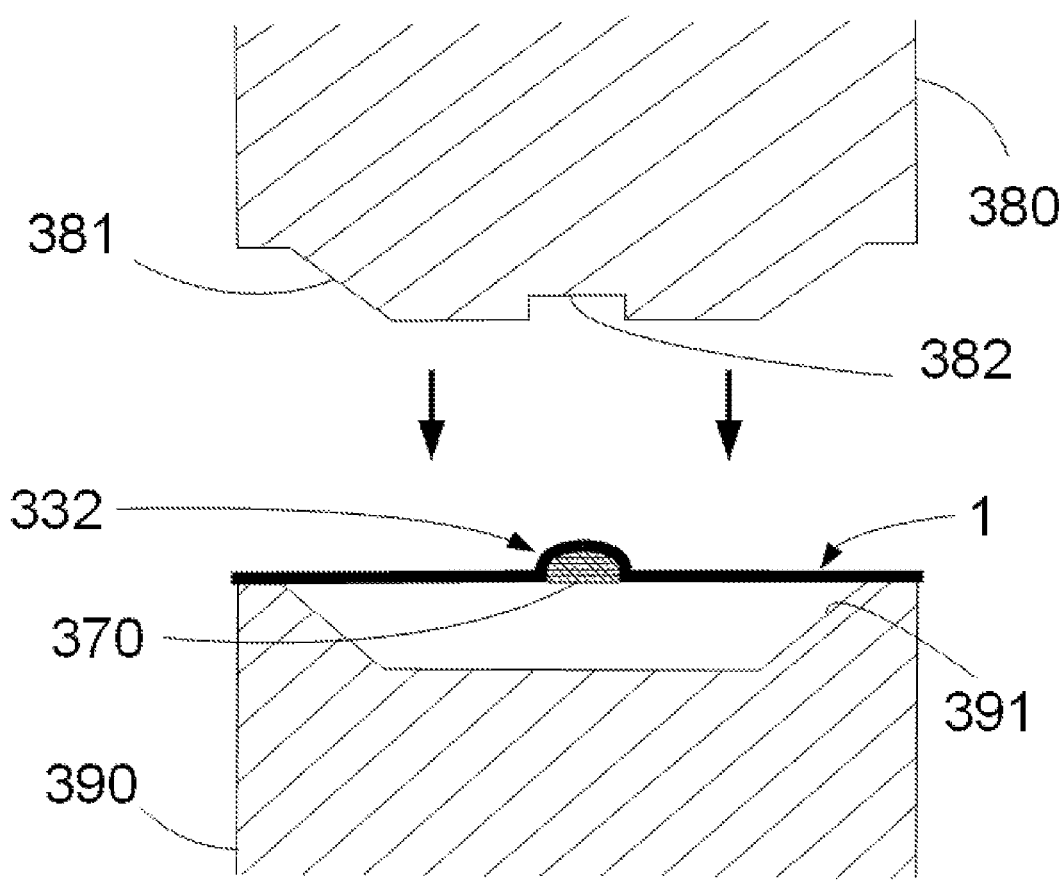

FIG. 3c shows an example wherein the melted deposited reinforcement material 370 may already be part of the blank 1, and, as a consequence, the blank 1 may be placed face down in the press tool. In the example of FIG. 3c, the upper 380 and lower 390 mating dies, which, in this example, correspond successively to lower 330 and upper 320 mating dies of FIGS. 3a and 3b, may be adapted to correspond with the current position of the recess. As shown in FIG. 3c the upper working surface 381 may be provided with a recess 382 (or recesses) where the groove 332 (or grooves) of the blank 1 may be situated i.e. the blank may be indistinctively placed in the press tool (face up or down) as shown in FIGS. 3a-3d.

Figure 3D:
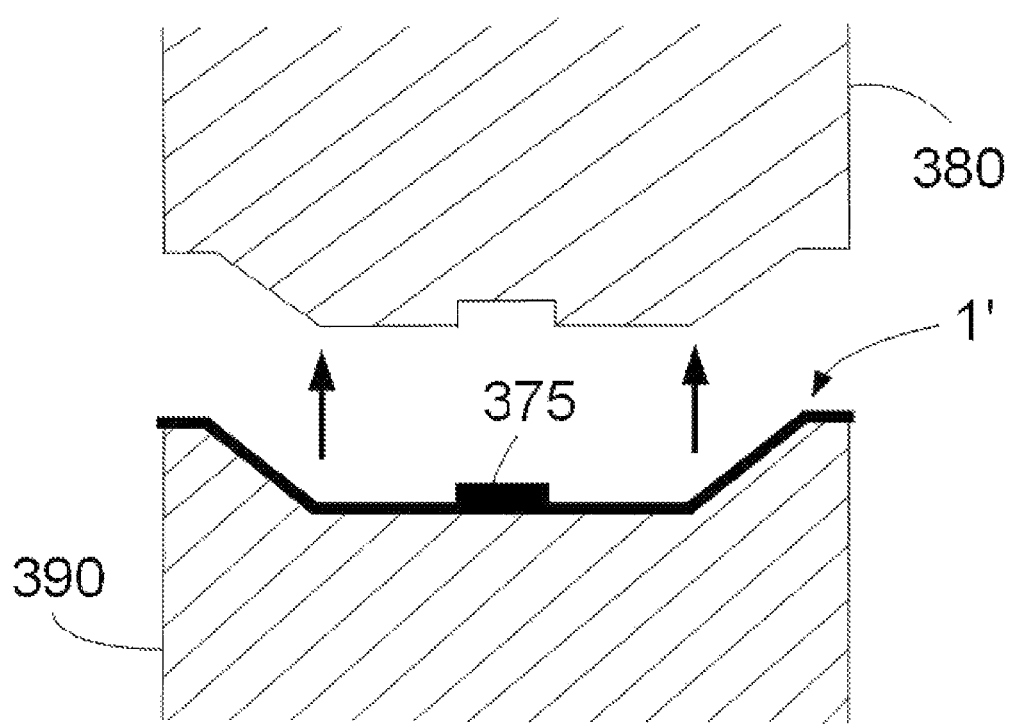

FIG. 3d shows another example of a formed blank 1' after being pressed and quenched into the press tool. Consequently, the groove filled with reinforcement material of FIG. 3c, has been transformed into a reinforcement 375.

In other examples of FIGS. 3a-3d, both upper 321, 381 and lower working surfaces, 331, 391 may be provided with a recess or with a plurality of recesses.

In further examples of FIGS. 3a-3d, the upper 320, 380 and lower 330, 390 mating dies may comprise a cooling system e.g. channels with cold fluid, to enable in-die quenching. The cold fluid flowing into the channels may be e.g. water and/or cold air. In the water channels, the speed of circulation of the water at the channels may be high, thus the water evaporation may be avoided. The channels with cold fluid allow cooling down of the area of the blank to be reinforced blank at a rate such that a final reinforcement results in a martensite microstructure.

A control system may further be provided, thus the temperature of the dies may be controlled. In further examples, other ways of adapting the dies to operate at lower or higher temperatures may also be foreseen, e.g. heating systems may be provided to control the cooling rate and/or to create areas having a ferrite-pearlite microstructure, i.e. soft zones which are zones in the component having reduced mechanical strength as compared to other parts of the component. Temperature sensors and control systems may also be provided to control the temperature of the dies.

In some examples, the groove may be formed in a blank. Afterwards, the reinforcement material may be deposited in the groove and may be joined to the blank by locally applying heat, e.g. with a laser. Then the blank might be cold formed. After the cold forming, the blank may be heated above austenization temperature in a furnace, after which the blank may be cooled and optionally (hot) deformed in a press tool. With appropriate cooling or quenching (depending on the steel composition), a martensite microstructure may be obtained in the whole blank or in specific areas of the blank.

Alternatively, the blank with the groove and reinforcement material joined to the blank may be submitted to a heat treatment in a furnace, after which the blank may be (hot) deformed and cooled. Again, a martensite microstructure may be obtained in the whole blank or in specific areas of the blank.

In yet a further alternative process, a blank (without a groove) may be hot deformed and cooled/quenched. The hot deforming may include the formation of the groove. After the formation of the groove, the reinforcement material may be deposited in the groove and locally heated. When the reinforcement material is being heated, the groove may be also directly heated e.g. by applying a heat source directly on the groove surface, or indirectly heated e.g. by the heat of the reinforcement material which has been deposited in the groove and heated. Thus, a HAZ may be created in the groove. Depending on the temperatures, heating methods and/or times used, it may be advantageous to locally provide cooling to the groove (on a site opposite to the side being heated) to limit the HAZ.

In yet a further alternative process, a blank (without any groove) may be cold deformed and in this deformation process, the groove(s) are formed. Then, the reinforcement material may be deposited and it may also be locally heated. After this, the blank may be heated above austenization temperature in a furnace, after which the blank may be cooled in a further press tool in which a further (hot) deformation process may take place. With appropriate cooling or quenching (depending on the steel composition), a martensite microstructure may be obtained in the whole blank or in specific areas of the blank.

In a further alternative process, a blank with a groove may be hot deformed and cooled/quenched. After the formation of the product, the reinforcement material may be deposited in the groove and locally heated. When the reinforcement material is being heated, the groove may be also directly heated e.g. by applying a heat source directly on the groove surface, or indirectly heated e.g. by the heat of the reinforcement material which has been deposited in the groove and heated. As previously mentioned, a HAZ may be created, however, cooling the groove may limit the HAZ.

In other examples, the blank may be cut from a steel coil by e.g. a cutting tool, and the groove may be formed simultaneously to the blank formation, i.e. when the blank is being cut from the steel coil e.g. by a press tool which may e.g. be coupled to the cutting tool. In further examples, the groove may be created e.g. by a press tool, before the blank is cut, i.e. when the part to be a blank is being uncoiled.

Figure 4:
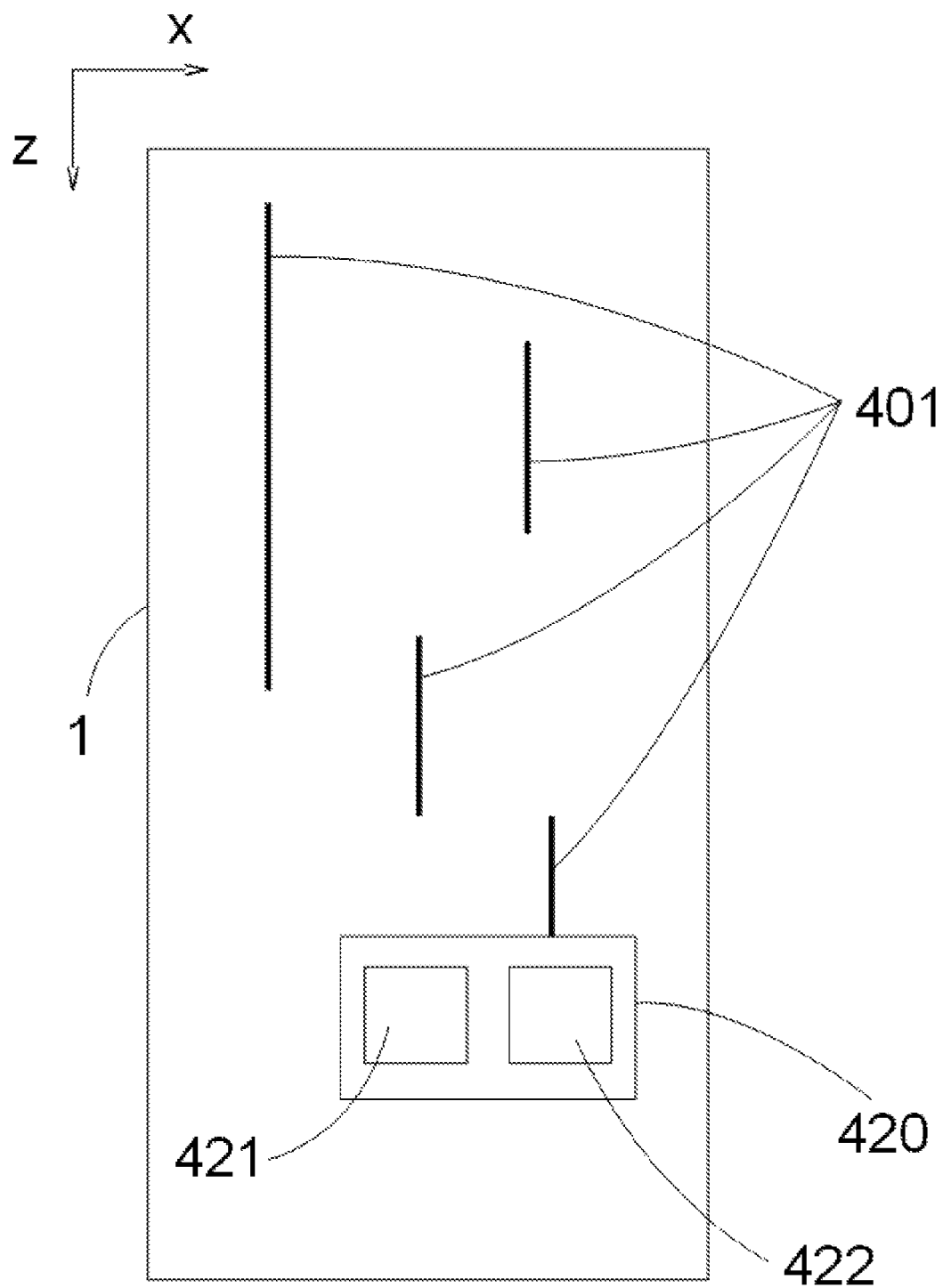
FIG. 4 schematically illustrates an example of a blank comprising a plurality of grooves.

In further examples, the blank 1 may be provided with a local or a plurality of local grooves with a predetermined length, so as to obtain a local or a plurality of local reinforcements (see FIG. 4). Consequently, a plurality of matching recesses may be provided along at least a working surface of the press tool to match the grooves.

FIG. 4 shows a top view of a blank 1 wherein a plurality of grooves 401 has been created. FIG. 4 also depicts a displaceable system 420 which may comprise a material depositor 421 and a laser heating system 422. The displaceable system 420 may be movable in the xz plane so as to deposit and melt the reinforcement material along each of the grooves 401.

Figure 5:
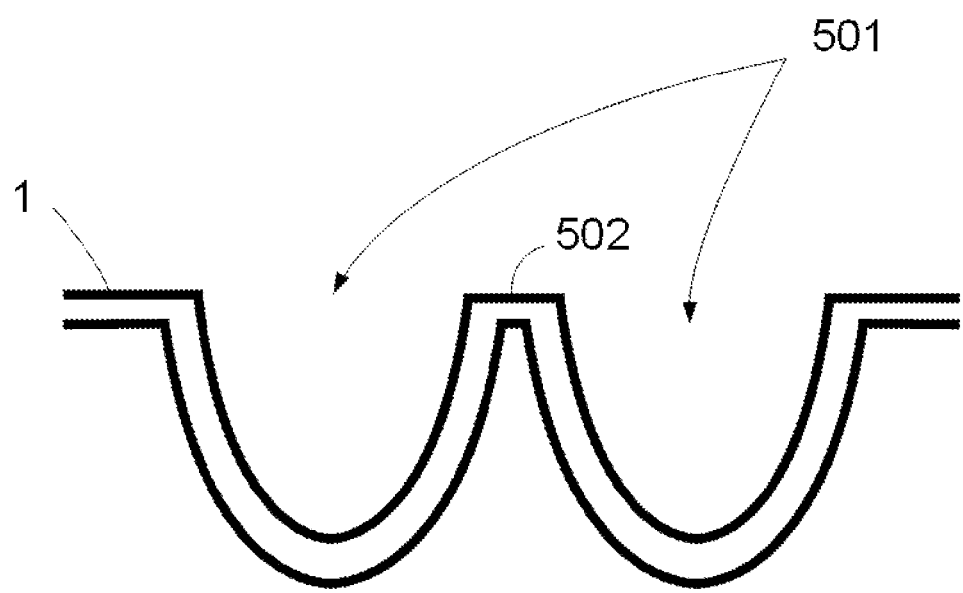
FIG. 5 schematically illustrates an example of a blank comprising two adjacent grooves.

FIG. 5 illustrates another example of a blank 1 wherein two adjacent grooves 501 have been made so as to increase the cooling rate of the groove area when (active) cooling is applied to be bottom side of the grooves. Increasing the cooling rate can reduce the extent of HAZ. The grooves 501 may be simultaneously formed in a press tool by e.g. cold or hot deforming. Between both grooves 501 an intermediary zone 502 may be provided to differentiate the created grooves.

Figure 6:
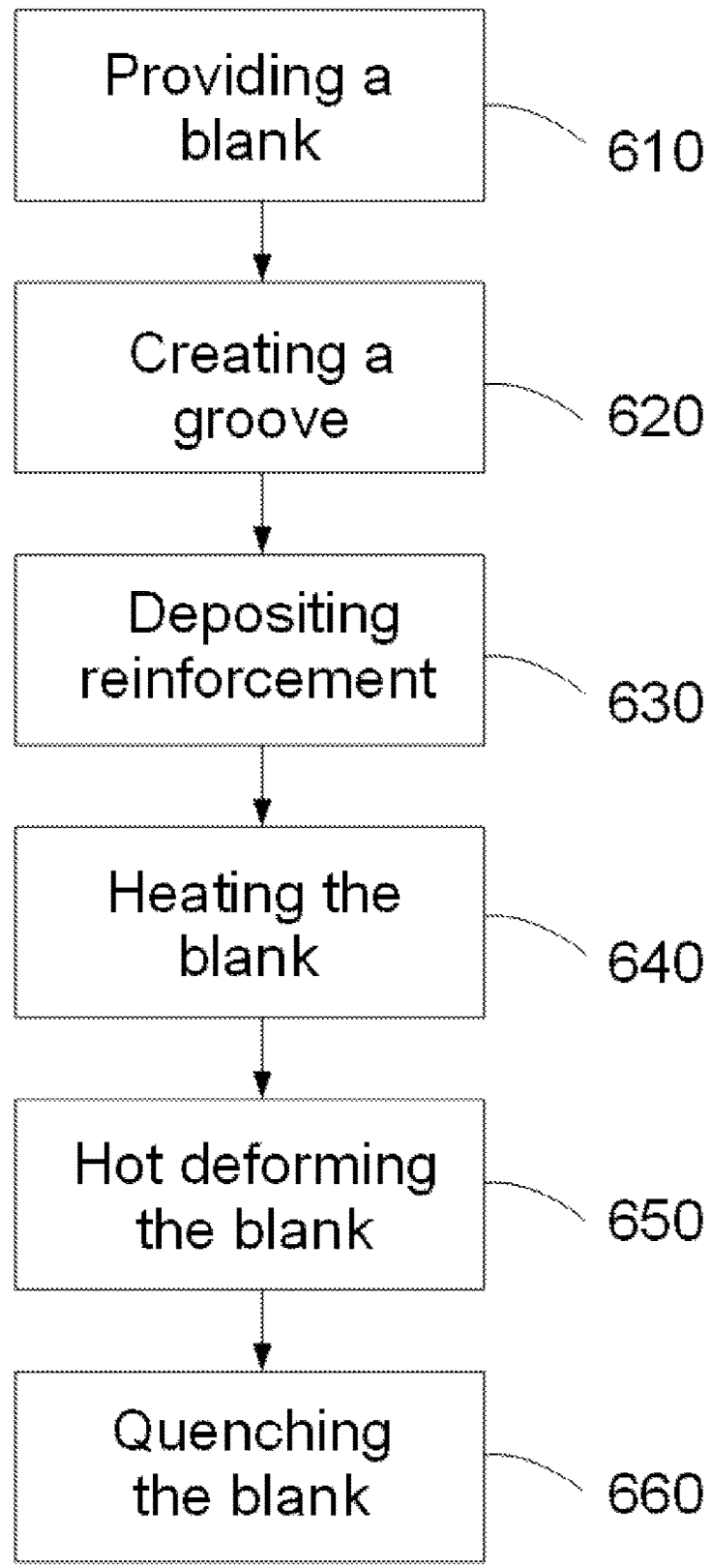
FIG. 6 shows an example of a method for manufacturing reinforced structural components.

In FIG. 6, an example of a method for manufacturing a reinforced component is shown. Firstly, a non-deformed blank may be provided 610 in which at least a zone to be reinforced may be selected. Then, a U-shaped cross-section groove may be created 620 in a selected area to be reinforced e.g. along a central portion of the entire length of the blank. Such groove may be created by e.g. cold stamping. In alternative examples a plurality of grooves may be created.

Next, a reinforcement material, e.g. a powder or a filler wire, may be deposited 630 in the groove by a material depositor. Optionally, before any subsequent process, the surface of the blank may be leveled i.e. any reinforcement material protrusion may be removed e.g. by sliding a skimming sheet over the blank.

The blank may be then heated 640 e.g. in a furnace at e.g. austenization temperature. Subsequently, the heated blank may be hot deformed 650 in a press tool to substantially obtain the final product shape. The deformed blank may finally be quenched 660. In an example, the press tool may comprise cooling elements e.g. cold water suppliers, to deform and quench the blank simultaneously. An additional quenching step out of the press too may also be performed. In examples, the deposited reinforcement material may be locally heated after or during the deposition.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for manufacturing structural steel components with local reinforcement, the method comprising:
providing a steel blank;
selecting at least a zone of the steel blank to be reinforced; wherein the blank comprises a groove in the zone to be reinforced and wherein the groove comprises an inner surface;
depositing a reinforcement material on the inner surface of the groove;
deforming the blank in a press tool to form a product; wherein the press tool comprises a recess for receiving the groove having the reinforcement material during the deforming the blank;
locally heating the reinforcement material and the groove of the steel blank to melt the reinforcement material and a portion of the steel blank;
mixing the melted reinforcement material with the melted portion of the steel blank to allow the melt reinforcement material to penetrate into the steel blank.

2. The method according to claim 1, wherein deforming the blank comprises hot deforming and cooling the blank.

3. The method according to claim 1, comprising making the groove in the blank.

4. The method according to claim 3, wherein the groove is made in the blank in a first cold deformation process.

5. The method according to claim 1, further comprising making the groove before or during cutting the blank from a steel coil.

6. The method according to claim 1, wherein locally heating the groove is done indirectly with the heat of the reinforcement material.

7. The method according to claim 1, wherein locally heating the groove is done directly by a laser beam.

8. The method according to claim 1, wherein the reinforcement material is a powder.

9. The method according to claim 1, wherein the reinforcement material is stainless steel.

10. The method according to claim 1, wherein the locally heating the reinforcement material is done by a first laser and the locally heating the groove of the steel blank is done by a second, different laser.

11. The method according to claim 1, wherein the depositing the reinforcement material is done by applying successive layers of reinforcement material and the locally heating the reinforcement material is done by a laser heating the reinforcement material and the inner surface of the groove at the same time the reinforcement material is being applied.

12. The method according to claim 11, wherein the locally heating the reinforcement material is done by a first laser and the locally heating the groove of the steel blank is done by a second, different laser.

13. The method according to claim 1, wherein depositing the reinforcement material on the inner surface of the groove and the heating the reinforcement material are conducted at the same time, and the method further comprises locally cooling an outer surface of the groove, on an opposite side where heat is being applied.

14. A method for manufacturing structural steel components with local reinforcement, the method comprising:
providing a steel blank;
selecting at least a zone of the steel blank to be reinforced; wherein the blank comprises a groove in the zone to be reinforced and wherein the groove comprises an inner surface;
depositing a reinforcement material on the inner surface of the groove;
deforming the blank in a press tool to form a product; wherein the press tool comprises a recess for receiving the groove having the reinforcement material during the deforming the blank;
locally heating the reinforcement material and the groove of the steel blank to melt the reinforcement material and a portion of the steel blank;
mixing the melted reinforcement material with the melted portion of the steel blank to allow the melt reinforcement material to penetrate into the steel blank; and
locally cooling an outer surface of the groove when the reinforcement material is being deposited.

15. A method for manufacturing structural steel components with local reinforcement, the method comprising:
providing a steel blank;
selecting at least a zone of the steel blank to be reinforced; wherein the blank comprises a groove in the zone to be reinforced and wherein the groove comprises an inner surface;
depositing a reinforcement material on the inner surface of the groove;
deforming the blank in a press tool to form a product; wherein the press tool comprises a recess for receiving the groove having the reinforcement material during the deforming the blank;
locally heating the reinforcement material and the groove of the steel blank to melt the reinforcement material and a portion of the steel blank;
mixing the melted reinforcement material with the melted portion of the steel blank to allow the melt reinforcement material to penetrate into the steel blank; and
wherein the reinforcement material is a filler wire.

* * * * *